Figure 1:
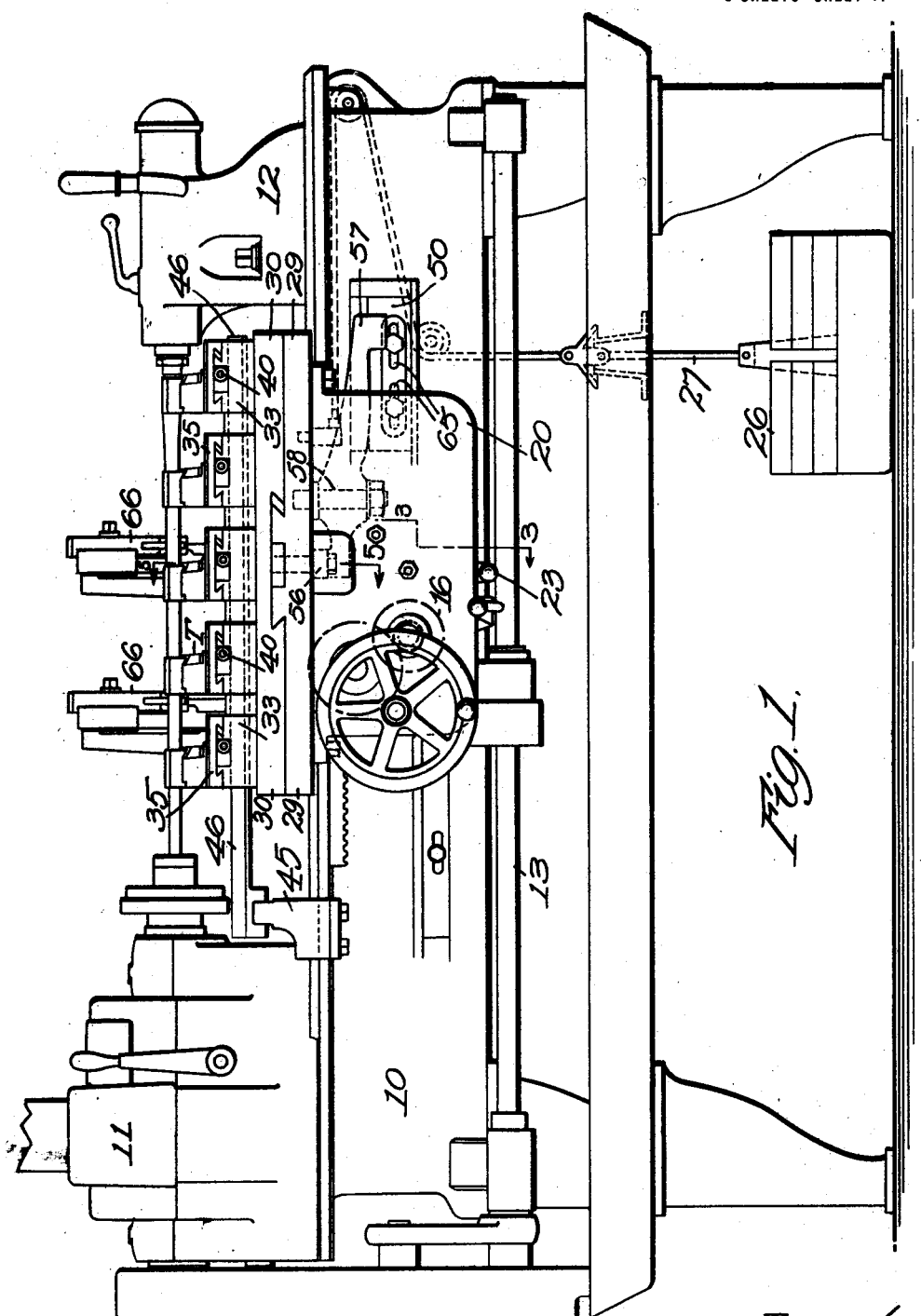

F. K. HENDRICKSON.
MULTIPLE TOOL TURNING LATHE.
APPLICATION FILED MAY 14, 1915.

1,191,305.

Patented July 18, 1916.
5 SHEETS—SHEET 1.

F. K. HENDRICKSON.
MULTIPLE TOOL TURNING LATHE.
APPLICATION FILED MAY 14, 1915.
1,191,305.
Patented July 18, 1916.
5 SHEETS—SHEET 2.
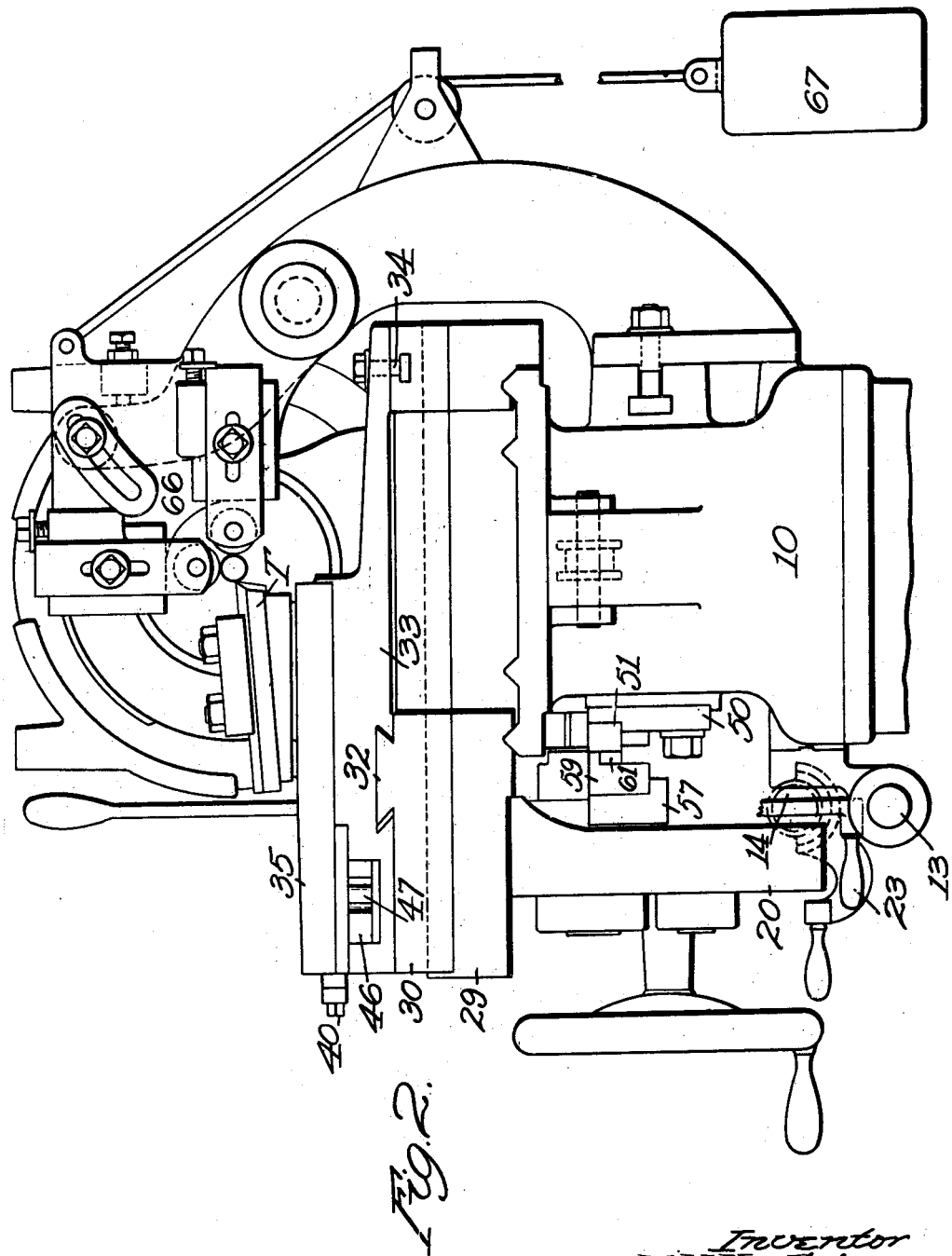

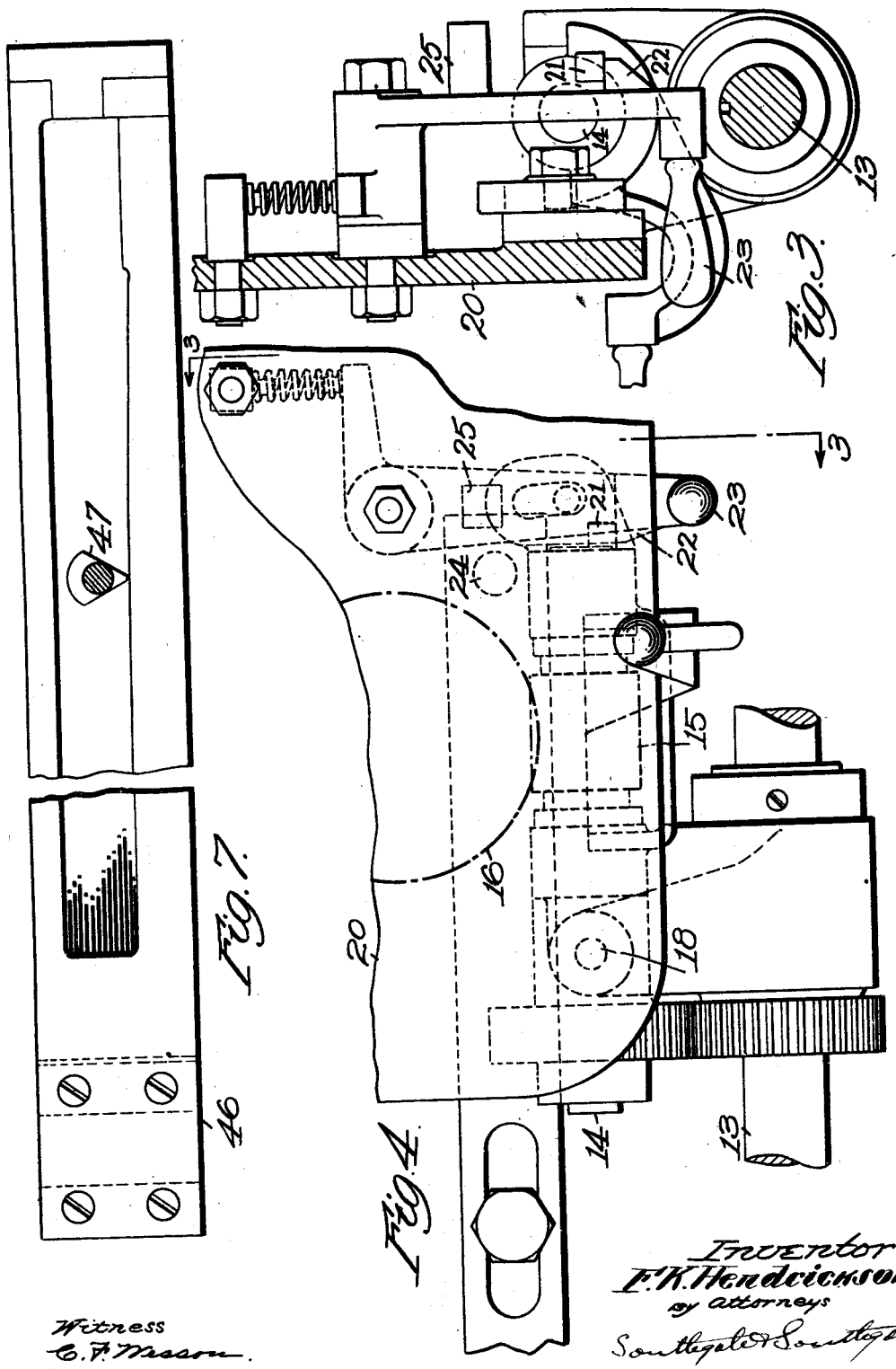

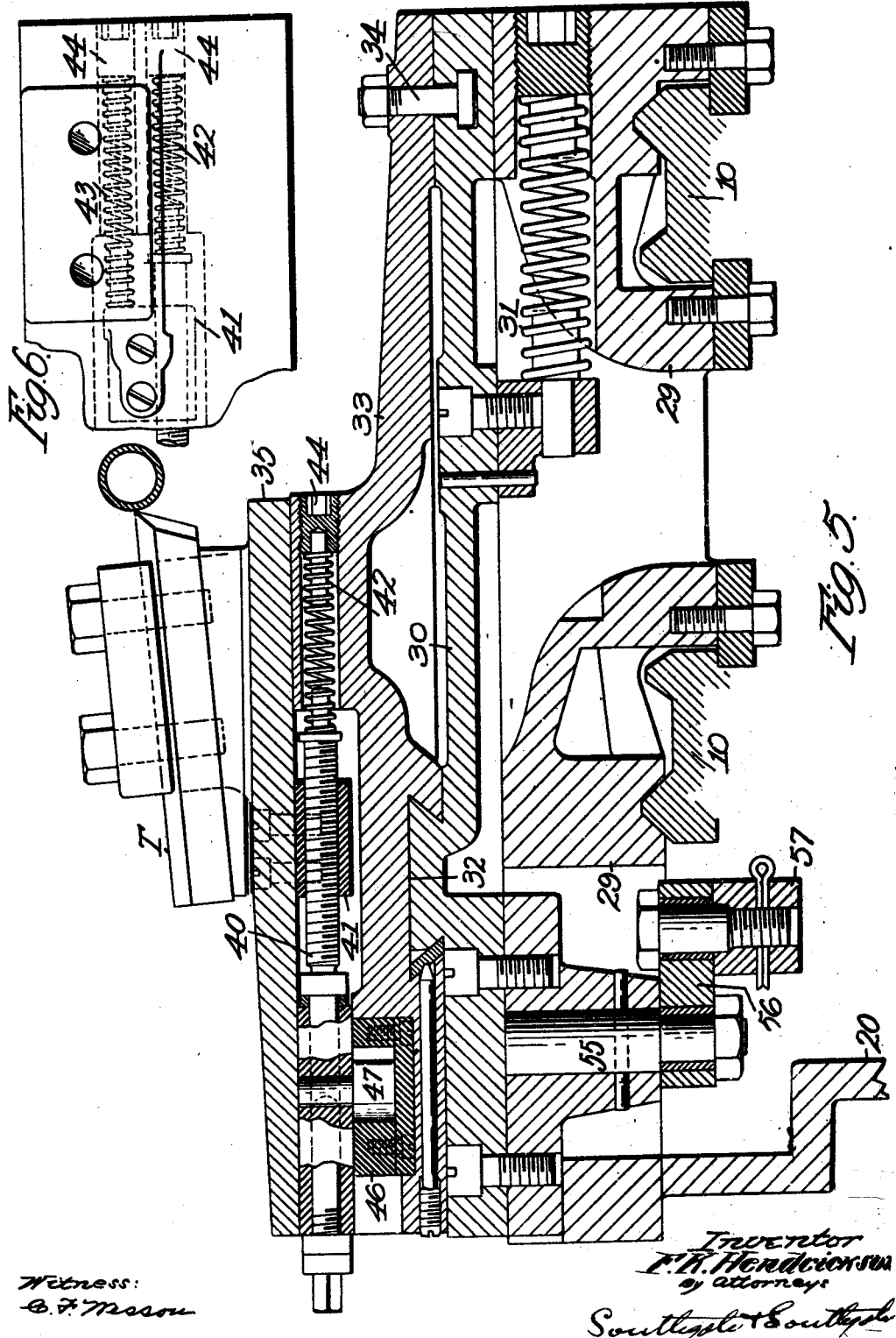

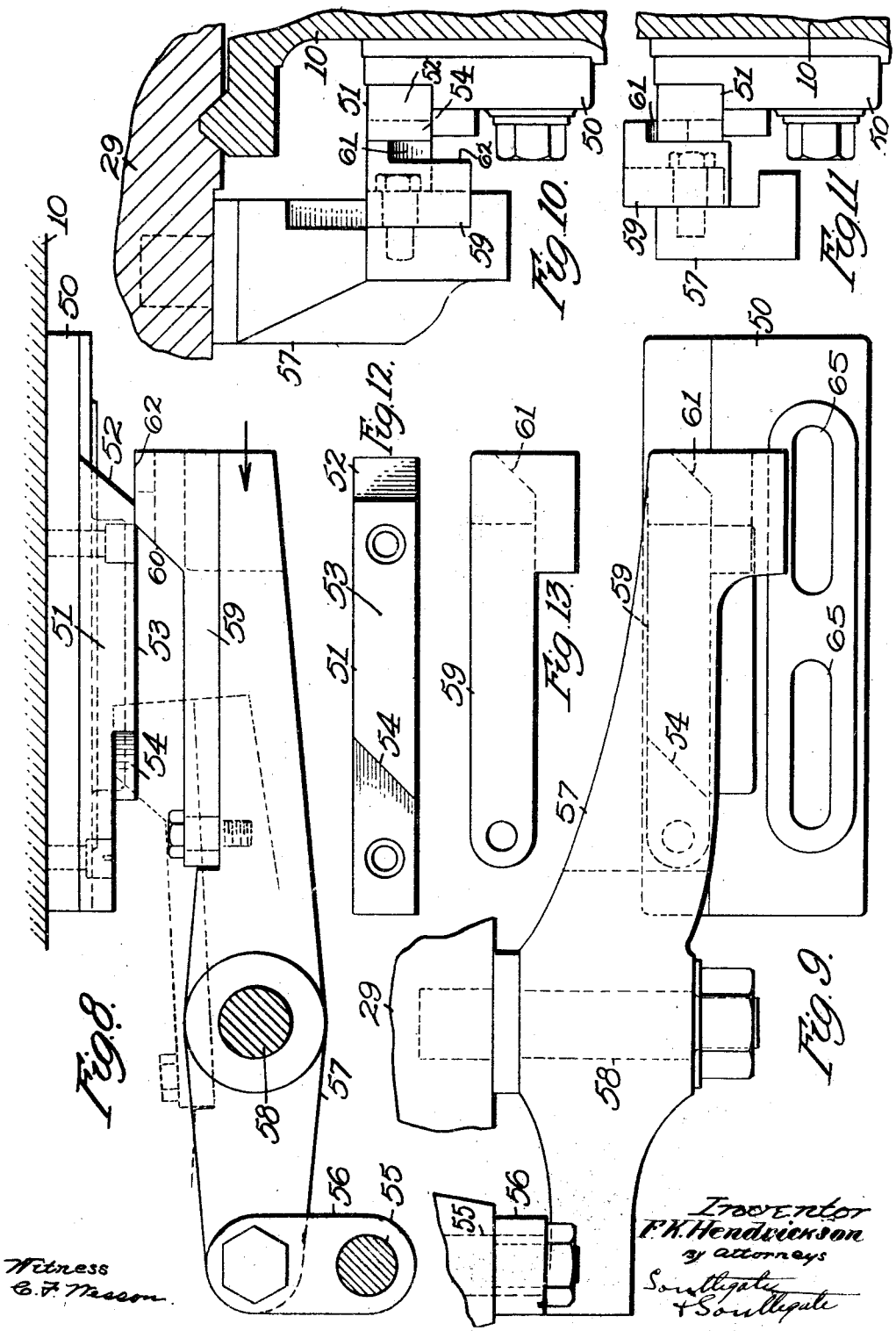

UNITED STATES PATENT OFFICE.

FRED K. HENDRICKSON, OF WORCESTER, MASSACHUSETTS, ASSIGNOR TO REED-PRENTICE COMPANY, A CORPORATION OF MASSACHUSETTS.

MULTIPLE-TOOL TURNING-LATHE.

1,191,305.

Specification of Letters Patent. Patented July 18, 1916.

Application filed May 14, 1915. Serial No. 28,183.

*To all whom it may concern:*

Be it known that I, FRED K. HENDRICKSON, a citizen of the United States, residing at Worcester, in the county of Worcester and State of Massachusetts, have invented a new and useful Multiple-Tool Turning-Lathe, of which the following is a specification.

This invention relates to a turning lathe and is particularly designed for the purpose of turning articles of considerable length.

The principal objects of the invention are to provide an arrangement whereby a plurality to tools can be used simultaneously for the turning of an object, either of a uniform cross section or otherwise, so that the length of travel will be proportionately decreased and the turning operation expedited in proportion to the number of tools used; to provide a simple means whereby the several turning tools will be controlled in such a way that wherever their paths of travel overlap they will make exactly the same cut and therefore leave the desired surface on the work without regard to the position in which the tools are located along the work and without regard to the particular shape or changes in shape which the work may have; to provide a simple means for forcing all the tools up to the work during the travel in one direction and relieving the same at the end of the travel, of such a nature that it embodies few parts and has no complications that are likely to get out of order or adjustment in use; to provide means whereby the tools are held firmly and chattering prevented, both individually and collectively; and to provide improvements in details of construction of the various parts of the machine.

Reference is to be had to the accompanying drawings in which.

Figure 1 is a front elevation of a lathe constructed in accordance with this invention and arranged for the turning of a gun barrel; Fig. 2 is an end elevation of the upper part of the same on enlarged scale; Fig. 3 is a sectional view on the line 3—3 of Fig. 1 showing the drop worm mechanism and connected parts; Fig. 4 is a front view of the same on enlarged scale; Fig. 5 is a sectional view on the line 5—5 of Fig. 1; Fig. 6 is a plan of part of the same with the tool rest removed; Fig. 7 is a plan of the tool controlling cam; Fig. 8 is a plan on enlarged scale of the means for controlling the movement of the auxiliary tool carriage toward and from the work, showing the position of the same during the cutting stroke in full lines and the reverse stroke in dotted lines; Fig. 9 is a front elevation of the same; Fig. 10 is an end view of the same with the bed in section showing the parts in the position shown in full lines in Fig. 8; Fig. 11 is a similar view with the parts in the position shown in dotted lines in Fig. 8, and some parts omitted; Fig. 12 is a front elevation of the cam for controlling the operating lever shown in Fig. 8; and Fig. 13 is a side view of the pivoted latch.

The invention is shown as applied to a turning lathe having the general characteristics of a well known type of machine involving a bed 10, head-stock 11, tail-stock 12, and the usual mechanism for driving the feed rod 13. This rod drives a drop worm shaft 14 carried by the apron 20, provided with a worm 15 operating a worm wheel 16, which, by mechanism not shown, controls the traverse of the tool carriage, as is well understood in the art. This worm shaft is pivotally mounted on a stud 18 on the apron 20 which constitutes a part of the main tool carriage 29 and is normally held up by means of a projection 21 movable therewith engaging a projection 22 on a spring-pressed lever 23. When the main carriage moves up toward the head, a stationary but adjustable stop 24 on the bed engages a lug 25 on the lever 23 and prevents the lever moving forward farther. Then the two lugs 21 and 22 separate and the worm shaft drops, thus disconnecting the carriage feed from the power. During the movement in this direction, the power has been raising a weight 26 connected by a cable or chain 27 with the carriage. Therefore, when the power is disconnected from the carriage, this weight is free to drop and it returns the carriage to its extreme right-hand position. This operation is stopped by the weight striking the floor. When it is desired to start again, it is necessary to raise the drop worm shaft, preferably by hand, when the lug 21 snaps over the lug 23 and rests thereon during the working stroke. This drop worm arrangement does not constitute a part of this invention, as it is shown and described in a prior application of Albert E. Newton and Fred K. Hendrickson on a drop table mechanism for milling machines filed December 21, 1914, Serial No. 878,270.

The main tool carriage 29 slides longitudinally on ways with the apron in the usual way. According to the present invention, this carriage is provided with transverse ways carrying an auxiliary tool carriage 30 movable toward and from the work and normally held back by a spring 31. This carriage has longitudinal ways 32 on which a series of individual tool rests 33 are located, being held at the rear end by bolts 34 or the like, all located in a T-slot. Each of these tool rests is designed to support a tool T and any desired number can be located on the auxiliary carriage. In the present instance five of them are shown. Each individual tool rest is provided with a support 35 on which the tool is clamped. In each tool rest is an adjusting screw 40 capable of being operated from the front of the machine by a wrench or the like applied to its projecting end. On this adjusting screw is a nut 41 with which the tool support 35 is connected for the purpose of adjusting this support forward and backward. At the end of the screw 40 is a spring 42 normally holding the screw back with a yielding pressure, and another similar spring 43 acts on the overhanging side of the nut 41. The pressure of these springs can be adjusted by means of nuts 44 at the ends thereof.

It will be understood that the individual tool holders are adjusted properly and that they are all controlled by the operation of the main tool carriage. Adjustably located on the bed is a support 45 to which is slidably connected a long cam 46 having a transverse slot for receiving the end of the support 45. This long cam is free at the other end and thus is capable of movement crosswise, but this is for the purpose of permitting the auxiliary carriage to be drawn back on the reverse stroke. It passes into an opening in the auxiliary carriage and its operative cam face engages cam followers 47, one on each tool rest. With some cams, rolls can be used instead of the followers 47. The springs 42 and 43 hold them against the cam. On the working stroke, the auxiliary carriage is held up to a certain point by means to be described, and each individual tool rest is controlled by the cam as the carriage moves.

For the operation of the auxiliary carriage 30, the following mechanism is provided. On the front of the bed is located a plate 50 on which is located a stationary cam 51. This cam is provided with a slanting cam surface 52 at one end, a flat surface 53 on the front, and with an inclined cam surface 54 at the opposite end of the surface 53. The slanting surface 52 is vertical. Mounted on a stud 55, carried by the auxiliary carriage, is a link 56 which is connected with the end of a lever 57 which is pivoted on a stud 58 mounted on the main carriage. On this lever 57 is pivoted on a horizontal axis a latch 59. This latch is provided with a slanting cam surface 60 for coöperation with the surface 52 and with an inclined surface 61 for coöperation with the surface 54. The end 62 is flat. It will be understood, of course, that the cam 51 can be adjusted longitudinally in slots 65 on the plate 50.

Although it does not constitute a part of this invention, two or more work rests 66 are shown provided with the usual counterweights 67 and operating in any desired way. It has been found desirable in practice to use two work rests for the turning of a gun barrel by means of five tools.

The operation of the machine is as follows: Let it be assumed that the drop worm has been put in gear and that the carriage is moving to the left on the operative stroke. The first result of motion in that direction is to bring the cam surface 60 to the left into contact with the surface 52 and thus cause the lever 57 to be forced forward at that end, and Fig. 8 shows it in full lines in the position occupied just after it has been forced out to its limiting position. Just as soon as the lever 57 turns on its pivot 58 and moves the link 56 inwardly, it forces the carriage 30 in toward the work. The tools all having been properly adjusted before, it will be obvious that these tools are thus forced toward the work but that individually they are capable of moving forward and back and they are controlled individually by the cam 46 so that each tool follows the cam, although the carriage 30 is forced positively toward the work a certain distance. The pressure on the lever 57 is transmitted positively, of course, to the auxiliary carriage 30 but is resisted by the heavy spring 31. This resistance is constant and yielding and prevents the chattering of the auxiliary carriage and furthermore, when the cam surface 61 reaches the surface 54 this spring forces the auxiliary carriage back so as to relieve the tools from the work. This is permitted by the fact that the surface 61 slips over the surface 54 and the latch 59 moves toward the bed to that extent. It is at this time that the drop worm operates to disconnect the apron from the power and the weight 26 operates to return the main carriage to its starting position. On the return movement, it is obvious that the surface 61 sliding up the surface 54 will raise the latch 59 about its pivot and cause its bottom surface to ride on the flat top surface of the cam 51. This permits the tools to remain back from the work during the entire reverse motion of the carriage. When this motion is nearly complete, the surface of the latch which has been sliding along the surface 53 slides inwardly on the incline 52 and allows the latch to drop back and the lever to assume its original position, at the same time drawing the tools still farther back.

By the use of this machine, assuming that five tools are employed, the amount of travel is reduced nearly one-fifth and this is an important feature in present day practice. It will be seen also that the large spring 31 holds the auxiliary carriage in opposition to the positive means for moving the same up toward the work and that the small springs 42 and 43 hold the followers 47 of the individual tool rests against the cam so that the cluttering is practically prevented. Furthermore, it will be seen that although a positive means is provided for forcing the auxiliary carriage toward the work and a positive means for controlling the exact position of each tool individually, yet these two positive means are arranged to coöperate with each other so as to allow of perfect control of the several tools so that at any instant one may be moving in and another out. On account of this long cam, it is clear that any part of it will have the same effect on two tools if they have to be controlled by that part at different points in their travel.

No claim is made herein to the drop worm arrangement, the counterweight for returning the carriage, or the work rests, for these features do not constitute a part of this invention.

Although I have illustrated and described only a single embodiment of the invention, I am aware of the fact that many modifications can be made therein by any person skilled in the art and that the invention can be used for purposes other than that herein shown and described without departing from the scope of the invention as expressed in the claims. Therefore, I do not wish to be limited to all the features of construction or to the particular application of the invention herein shown, but What I do claim is:—

1. In a lathe, the combination of a tool carriage, a plurality of tool rests movably mounted thereon, means for forcing the tool carriage toward the work, and means whereby each of the tool rests is forced toward or from the work and each one controlled individually.

2. In a lathe, the combination of a main carriage, an auxiliary tool carriage movable crosswise thereon, a plurality of tool rests movably mounted on the auxiliary carriage, means for traversing the main carriage, means for individually adjusting the tool rests, means for positively forcing the auxiliary carriage toward the work and holding it in a definite position during the entire operative travel of the main carriage, and means whereby each of the tool rests is forced toward or from the work and each one controlled individually.

3. In a lathe, the combination of a tool carriage, means for traversing it along the work, a plurality of individual tool rests mounted on the tool carriage, and means whereby each of said tool rests is individually controlled and operated in exactly the same way at any definite point along the course of travel of the tool carriage.

4. In a lathe, the combination of a tool carriage movable back and forth and also transversely, a plurality of individual tool rests mounted thereon and each transversely adjustable, means for holding the tool carriage toward the work, and means extending throughout the length of the work and adapted to control any of the tool rests that come into contact with it for controlling the exact position of said tool rests at all times during the travel of the tool carriage.

5. In a lathe, the combination of a main tool carriage movable back and forth, a plurality of tool rests carried with the main tool carriage, a cam extending longitudinally with respect to the work, and means carried by each tool rest for engaging said cam and controlling the position of said tool rests on the carriage.

6. In a lathe, the combination of a tool carriage movable back and forth and also transversely, means for holding said tool carriage in a definite position with respect to the work, a plurality of tool rests mounted on said tool carriage, a cam extending throughout the length of the work, means carried by each tool rest for engaging said cam and controlling the position of said tool rests, and yielding means for keeping each tool rest in engagement with said cam throughout the travel of said tool carriage along the work.

7. In a lathe, the combination of a tool carriage movable parallel with the center line of the machine, an auxiliary tool carriage mounted thereon, means for moving the auxiliary carriage transversely, a tool rest carried by the auxiliary carriage, a screw connected with the tool rest, and a cam for moving the screw and tool rest transversely toward or from the work along the auxiliary carriage as it moves along the work.

8. In a lathe, the combination of a tool carriage movable along the work, means for positively holding the carriage toward the work, a cam controlling the distance of the carriage from the work while it moves along, a tool-rest carried by and movable with the carriage, and means for moving said tool rest toward or from the work as the carriage moves along the work.

9. In a lathe, the combination of a carriage movable along the work, means for positively holding the carriage toward the work, a cam controlling its distance from the work while it moves along, a tool rest carried by and movable with the carriage, yielding means for forcing said tool rest transversely on the carriage, and stationary means for moving said tool rest positively toward the work against said yielding means as the carriage moves along the work.

10. In a lathe, the combination with a tool carriage movable along the work, positive means for forcing the tool carriage toward the work and controlling its position relative to the work as the tool carriage moves along, a cam extending along the carriage lengthwise of the work and located in stationary position, a follower engaging the surface of said cam, an adjusting screw connected with said follower and movable therewith, a spring for forcing said adjusting screw and follower toward the cam, and a tool rest adjustably connected with said screw and adapted to move therewith.

11. In a lathe, the combination of a reciprocable main carriage, an auxiliary carriage transversely movable thereon, positive means for holding the auxiliary carriage toward the work, a spring arranged to oppose said positive means, a tool rest mounted on said auxiliary carriage and adjustable thereon in the direction of motion of the main carriage, and also transversely, and means for moving the tool rest transversely as the main carriage moves longitudinally.

12. In a lathe, the combination with a tool carriage movable along the work, a spring for holding the tool carriage yieldingly away from the work, and a cam in position to positively force the tool carriage back in opposition to the spring, of a plurality of tool rests mounted on the carriage, and means separate from the carriage for controlling the position of said tool rests on the carriage during the motion of the carriage back and forth.

13. In a lathe, the combination with a tool carriage movable along the work, of a spring for holding the tool carriage yieldingly away from the work, a lever connected with said carriage, a cam in position to operate the lever and positively force the tool carriage back in opposition to the spring, and means whereby the cam loses control of the carriage at the end of the stroke so as to leave the spring free to draw the carriage back from the work.

14. In a lathe, the combination of a tool carriage, means for normally forcing it back from the work, a lever carried by the carriage for moving it, a stationary cam located in position to engage said lever to force the carriage against said means, a latch on the lever for engaging said cam and having means whereby at the end of the stroke the latch is thrown out of contact with the operative face of the cam and the lever allowed to move to a position to allow the first named means to draw the carriage back from the work.

15. In a lathe, the combination of a carriage adapted to move back and forth, a lever movable back and forth with the carriage and having means for moving the carriage toward and from the work, a stationary cam having a surface arranged parallel with the direction of motion of the carriage, and a latch on said lever adapted to engage said cam during the working stroke and hold the lever and carriage in a definite position, said latch and cam having means for moving the latch out of engagement with said surface at the end of the working stroke, whereby the latch will be prevented from holding the lever in a position to force the carriage to its extreme inward position.

In testimony whereof I have hereunto set my hand.

FRED K. HENDRICKSON.